United States Patent [19]

Rempfer et al.

[11] 3,711,042

[45] Jan. 16, 1973

[54] AIRCRAFT CONTROL SYSTEM

[75] Inventors: Paul S. Rempfer, Heath, Ohio; Alan J. Robertson, Topsfield; Lloyd E. Stevenson, Wakefield; Joseph S. Koziol, Jr., Newtonville, all of Mass.

[73] Assignee: The United States of America as represented by the Administrator of the National Aeronautics and Space Administration

[22] Filed: July 13, 1970

[21] Appl. No.: 54,271

[52] U.S. Cl. ............... 244/77 D, 244/17.13, 318/489
[51] Int. Cl. ............................................. B64c 13/18
[58] Field of Search ........ 244/77 D, 3.21, 77 A, 77 E, 244/17.13; 318/489

[56] References Cited

UNITED STATES PATENTS

| | | | |
|---|---|---|---|
| 3,592,417 | 7/1971 | Simon | 244/77 D |
| 3,584,814 | 6/1971 | Murphy | 244/77 D |
| 3,287,724 | 11/1966 | Zupanick | 244/77 D |
| 3,482,805 | 12/1969 | Knemeyer | 244/77 D |
| 3,575,362 | 4/1971 | Hammond | 244/77 D |
| 3,182,933 | 5/1965 | Smith et al. | 244/77 D |
| 3,095,169 | 6/1963 | Osder | 244/77 D |
| 3,521,839 | 7/1970 | Diani | 244/77 D |
| 3,240,447 | 3/1966 | Olshausen | 244/77 D |

*Primary Examiner*—Milton Buchler
*Assistant Examiner*—Stephen G. Kunin
*Attorney*—Herbert E. Farmer and John R. Manning

[57] ABSTRACT

An aircraft control system, particularly suited to rotary wing aircraft, in which longitudinal acceleration and course rate commands are derived from a manual control stick to control translational velocity of the aircraft along a flight path. In the collective channel the manual controls provide vertical velocity commands. In the yaw channel the manual controls provide sideslip or heading rate commands at high or low airspeeds, respectively. The control system is particularly suited for rotary wing aircraft and permits pilots to fly along prescribed flight paths in a precise manner with relatively low work load.

10 Claims, 3 Drawing Figures

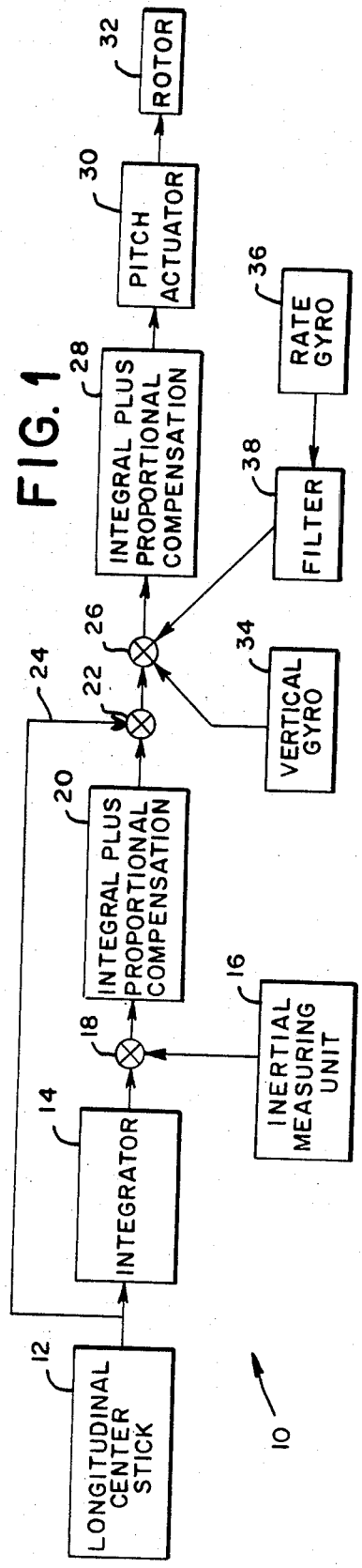
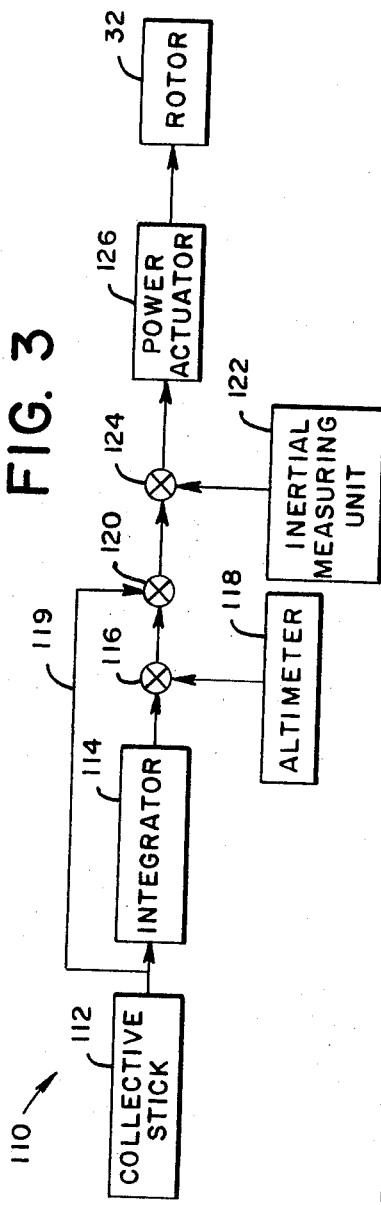
FIG. 1
FIG. 3

AIRCRAFT CONTROL SYSTEM

ORIGIN OF THE INVENTION

The invention described herein was made by employees of the United States Government and may be manufactured and used by or for the Government for governmental purposes without the payment of any royalties thereon or therefor.

BACKGROUND OF THE INVENTION

1. Field of the Invention

This invention relates to the field of aircraft and is more particularly related to aircraft flight controls for the guidance of aircraft.

2. Description of the Prior Art

The general task of an aircraft pilot is to control the translational velocity of the aircraft so that the craft flies along a prescribed flight path. In contemporary commercial aircraft, translational velocity is controlled indirectly by the pilot. The indirect control is particularly noticeable in rotary wing aircraft, where the vehicle is generally unstable or, at most, includes an attitude stabilizing control system to assist the pilot. Although helicopters with such stabilizing systems demand a high pilot work load, their utility under visual flight rules has not been hampered and they have been used successfully. It is generally agreed, however, that an advanced control system is required before the full operational usefulness of the helicopter will be realized.

It is, accordingly, an object of the present invention to disclose an aircraft control system which permits a pilot to directly control ground velocity and vertical velocity over the entire flight regime of rotary wing aircraft.

It is still a further object of the present invention to disclose a helicopter control system which can be operated by the pilot to direct the helicopter along its flight control path without excessive work load.

It is a further object of the present invention to disclose a helicopter control system in which the input devices provide a commanded rate of change of vehicle course, rate of change of vehicle ground velocity and change in vehicle vertical velocity.

SUMMARY OF THE INVENTION

The novel aircraft control system incorporates a control member which introduces acceleration and course rate commands in the pitch and roll channels, respectively, to directly control the translational ground velocity of a rotary wing aircraft. The acceleration commands are integrated and compared with a ground velocity signal measured along the longitudinal axis of the aircraft. Similarly, the course rate commands are integrated and compared with a course signal. In both cases an error signal is produced by the comparison, and control actuators are driven by the error signal to guide the aircraft along the desired flight path at a desired ground velocity. In addition to the error signal developed from the integrated signal, the command signal itself is applied to the control actuators directly.

Both the pitch and roll control channels include attitude stabilizing devices in the form of vertical gyros and rate gyros. Integral plus proportional compensation is also employed to obtain a zero steady-state error.

The collective channel for the helicopter control system is similar in construction to the lateral and longitudinal channels except that the collective stick commands a vertical velocity and the channel has an altitude hold capability.

The yaw channel has two modes of operation for two different airspeeds of the aircraft. In the low speed mode, the foot pedals command a yaw rate which is compared with a measured yaw rate. An integrated rate signal is compared with a heading reference signal for a heading hold capability. The resulting error signal from the two comparisons controls the yaw channel actuator. In the high speed mode, the foot pedals command side-slip which is compared with a filtered, measured sideslip signal to control the yaw channel actuator. In addition, in this mode a filtered roll signal from the lateral channel is cross coupled so that coordinated turns can be made by means of the lateral control stick.

DESCRIPTION OF THE DRAWINGS:

The novel aircraft control system will be better understood together with its numerous objects and advantages by reference to the following drawings in which like reference numerals refer to like elements throughout the several figures.

FIG. 1 is a diagramatic presentation of the longitudinal control channel of the aircraft control system.

FIG. 3 is a diagramatic presentation of the collective control channel of the aircraft control system.

Figure 2:
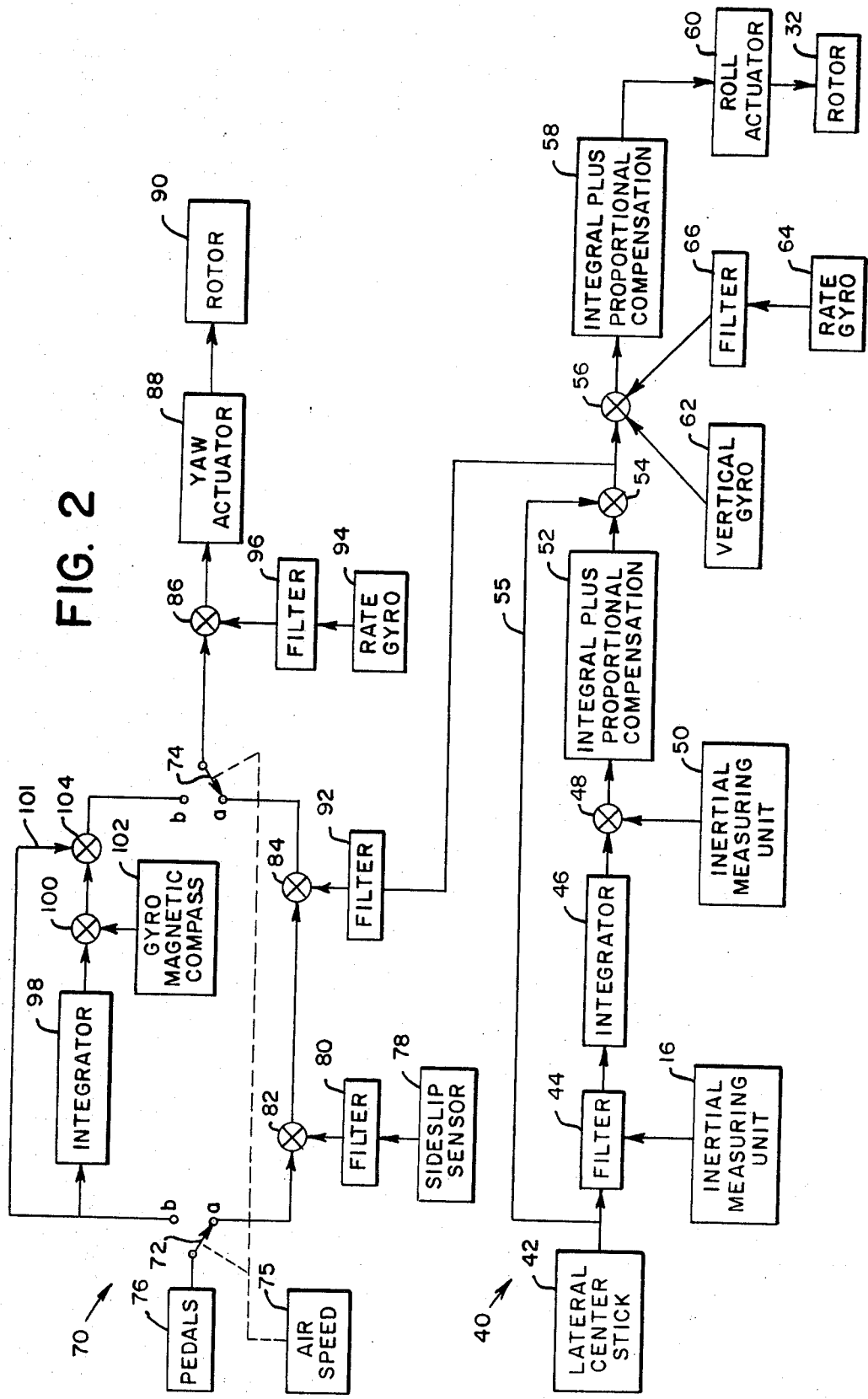
FIG. 2 is a diagramatic presentation of both the lateral control channel and the yaw control channel which includes a cross coupling input from the lateral channel.

DESCRIPTION OF THE PREFERRED EMBODIMENTS:

The novel aircraft control system is a four axis system. The pilot directly controls the aircraft translational acceleration with respect to the ground, course rate, rate of descent, and, at high forward speeds, sideslip and at low forward speeds, heading rate. Because the control system is particularly suited to rotary wing aircraft, the invention is described in an embodiment particularly adapted to helicopters.

FIG. 1 discloses the longitudinal control channel generally designated 10. The longitudinal channel is an acceleration command channel with velocity holding capability. The manual control member operated by the pilot is the longitudinal center stick 12. When the center stick 12 is displaced from its central detent position, a translational acceleration command with respect to the ground is produced. The commanded acceleration is converted by integrator 14 to a commanded ground speed. An inertial measuring unit 16 is installed in the helicopter to provide a signal representative of the aircraft longitudinal ground speed. The inertial measuring unit 16 may be a stable platform on which integrating accelerometers are positioned to sense the movement of the aircraft along the longitudinal axis of the airframe. The signals from integrator 14 and inertial measuring unit 16 are compared in an algebraic summing device or comparator 18 which produces an output equal to the ground speed error. The error signal from comparator 18 passes through a compensation network 20 to a summing network 22 which also has a direct acceleration input from the longitudinal stick 12 through path 24.

The compensation network 20 has both integrating and proportional circuits which generate an incremental acceleration command proportional to the error in ground speed and the integral of the error. This type of compensation serves as a trimming input which forces the stead-state error in ground speed toward zero. The incremental acceleration command is then summed with the original acceleration command at the summing network 22 to provide a pitch attitude command signal.

The pitch attitude command signal is translated through another summing network 26, compensation network 28 to the pitch actuator 30 connected to the helicopter rotor or rotors 32. A vertical gyro 34 provides a stabilizing signal representative of the aircraft pitch attitude and a rate gyro 36 provides a damping signal representative of the aircraft pitching rate. Filter 38 associated with the rate signal of the gyro 36 serves to smooth the signal. Both of the gyroscopically produced pitch attitude and pitch rate signals are added at summing network 26 to the pitch attitude command from summing network 22. The summing network 26 is an algebraic summation device similar to comparator 18 and the output of the network 26 is a pitch attitude error representing the difference of the pitch attitude command and the sensed attitude and rate signals.

The compensation provided by network 28 also has integrating and proportional characteristics similar to network 20. Again, the compensation network 28 serves as a trimming device.

The error signal then drives the pitch actuator 30 which in turn controls the helicopter rotor 32. It will be understood that between the pitch actuator 30 and the blades of rotor 32, conventional rotor control linkage including a swashplate are provided in order to vary the angle of attack of the rotor blades and generate an aircraft pitching moment.

When the longitudinal center stick 12 is in its central or detent position corresponding to zero acceleration command, the helicopter maintains the ground speed present at the output of integrator 14.

The lateral control channel, indicated generally by the reference numeral 40 in the lower portion of FIG. 2, is a course rate command system with a course hold capability. In a manner similar to the longitudinal channel, the pilot commands course rate by displacing his lateral center stick 42 from its central detent position. In contrast to the longitudinal channel, however, the course rate signal is transmitted to a blocking filter 44 before it reaches integrator 46. The filter is controlled by the inertial measuring unit 16 and acts as a gate to block the course rate command from passing to integrator 46 whenever the indicated ground speed from unit 16 is less than a preselected speed, for example, 10 feet per second. When the ground speed is equal to or greater than the preselected speed, the filter 44 permits the course rate command to be passed to integrator 46 which converts the course rate to a course command. The course command from integrator 46 is compared by comparator 48 with a course signal from inertial measuring unit 50. It will be understood that the inertial measuring unit 50 may share several components with inertial measuring unit 16, particularly a stabilized platform, if the velocity signals are generated by an integrating accelerometer. The output of the comparator 48 is a course error signal which is transmitted to compensation network 52 and a summing network 54. The compensation network 52, as in the longitudinal channel, has both proportional and integrating characteristics so that an incremental course command proportional to the course error and its integral is produced. Again the integrated signal serves as a trimming input in the system.

The incremental course command is summed with the original course command transmitted by path 55 at summing network 54. The combined signals are a roll attitude command proportional to the sum and are transmitted through summing network 56, compensation network 58 and roll actuators 60 to the rotor 32. A vertical gyro 62 which also may share a number of components, such as a gimbal system and rotor, with vertical gyro 34 in FIG. 1 delivers a stabilizing signal representative of aircraft roll attitude to unit 56 and rate gyro 64 produces a roll rate signal transmitted through a smoothing filter 66 to network 56. The rate and attitude signals are algebraically added to the roll attitude command to produce a lateral error signal. The error signal passes through compensation network 58 which has proportional and integrating characteristics, again to serve as a trimming device. The compensated error signal drives actuator 60 which in turn, through the conventional swashplate, controls lateral cyclic pitch on rotor 32 to produce aircraft rolling moments.

When the lateral center stick 42 is in its central or detent position corresponding to zero course rate, the helicopter maintains the course indicated at the output of integrator 46. When the helicopter ground speed signal from inertial measuring unit 16 is equal to or greater than the preselected value which opens the blocking filter 44, the lateral command channel 40 operates as a course rate command system with a course hold capability as described. When the ground speed drops below the preselected value, the roll axis becomes a course deviation command system with respect to the course held by the output of integrator 46.

The yaw control channel, indicated generally by the numeral 70 at the upper portion of FIG. 2, is a sideslip command system with coordinated turn capability whenever the helicopter airspeed is equal to or greater than a preselected value, for example 50 feet per second, and is a heading rate command system with heading hold capability whenever the airspeed is less than the preselected value. The switching between the two modes of operation is automatic.

With the ganged mode switches 72 and 74 in position a as shown in FIG. 2, the yaw channel is in the sideslip command mode. The mode switches 72 and 74 are actuated to the a position above the preselected airspeed by an airspeed sensor 75. Displacement of the pilot's pedals 76 from the central or detent position commands a sideslip. The sideslip sensor 78 is an air data sensor and produces a signal representative of the aircraft sideslip. A filter 80 smooths the sideslip signal. The sideslip command from pedals 76 is compared with the sensed sideslip at algebraic comparator 82 which produces a yaw rate command proportional to sideslip error. The sideslip error is transmitted through summing network 84, switch 74, summing network 86 and yaw actuator 88 to the helicopter tail rotor 90.

It will be understood that the yaw actuator 88 may be connected in certain helicopters having tandem rotors to the tandem rotors rather than a separate tail rotor to generate the yawing moment.

The roll attitude command is also cross coupled from the lateral channel 40 through a smoothing filter 92 and is added to the sideslip error at summing network 84. This cross coupled roll signal permits the helicopter to execute coordinated turns by means of the lateral center stick 42 while in the sideslip mode of operation. Any sideslip command is summed with the roll command at summing network 84 to generate a yaw error signal.

A rate gyro 94 supplies a yaw rate damping signal through smoothing filter 96 to the summing unit 86 where the damping signal is combined with the error signal upstream of this summing junction.

It will be noted that when the pilot's pedals 76 are in the central or detent position in the sideslip mode, the sideslip error at higher forward speeds should be zero for the most part and coordinated turns may be accomplished by means of the lateral center stick 42.

When the helicopter airspeed drops below the preselected value, the airspeed sensor 75 automatically changes the flight mode switches 72 and 74 from the *a* to the *b* position converting the yaw channel 70 to a heading rate command system with heading hold capability. In this mode, a displacement of the pilot's pedals 76 from the central position commands a heading rate. The commanded heading rate is converted by integrator 98 to a heading command and is transmitted to comparator 100 where it is combined with a heading reference signal from magnetic gyro compass 102. The output of comparator 100 is the incremental heading rate command proportional to heading error. This heading error is summed with the original heading rate command in path 101 at summing network 104 to provide a yaw rate signal proportional to the sum. The transmission of the error signal through switch 74, summing network 86, yaw actuator 88 to rotor 90 is as described above.

When the pilot's pedals 76 are in the central position in the heading rate mode, commanding a zero heading rate, the helicopter maintains the heading indicated by the output of integrator 98.

The vertical or collective control channel is indicated generally by the reference numeral 110 in FIG. 3. The collective control channel is a rate of descent command system with altitude hold capability. The positioning of the collective stick 112 commands a rate of descent or velocity. The rate of descent command is converted by the integrator 114 to an altitude command. An altimeter 118 provides a signal representative of the actual aircraft altitude and the commanded altitude is compared with the sensed altitude signal in comparator 116. The output of comparator 116 is an incremental rate of descent command proportional to altitude error. The incremental command is summed with the original rate command transmitted by path 119 from the collective stick 112 at summing network 120 to provide a net rate of descent command.

An inertial measuring unit 122 provides a signal representative of the actual aircraft rate of descent. The measuring unit 122 also may share a stable table with the measuring units 16 and 50 in FIGS. 1 and 2 respectively. The overall rate of descent command from summing network 120 is compared with the sensed rate of descent from unit 122 at the comparator 124. The resulting error signal from comparator 124 is then supplied to power actuator 126 and the helicopter rotor 32. Power actuator 126 operates through a swashplate on the rotor blades collectively to affect the thrust of the helicopter rotor.

When collective stick 112 is in its centered position, the pilot commands a zero rate of descent and the helicopter maintains the altitude indicated by the output of integrator 114. Therefore, the collective stick commands a velocity and the collective channel is capable of holding altitude whenever the collective stick is in its centered position.

It is seen from the above that an aircraft control system is disclosed which employs acceleration commands in the longitudinal channel and course rate commands in the lateral channel to control the translational ground velocity of the aircraft. The yaw channel produces sideslip commands and allows coordinated turns in upper speed ranges and automatically converts to a hanging rate command system with heading hold capability in the lower speed ranges. The collective channel produces rate of descent commands and has altitude hold capabilities through the full flight regime of the aircraft.

While the novel aircraft control system has been described with particular instruments and control mechanisms, it should be understood that various modifications and substitutions can be made without departing from the spirit of the invention. The manual control members employed by the pilot may be side arm controllers. If a high quality inertial measuring unit is employed to produce the velocity information, it may also be used in place of the vertical gyro and gyro compass to supply the reference attitude and reference heading information. While the inertial measuring unit was described as including a stable table, a strapped-down system with rate gyros may be used to supply the required angular rate information. With the stable table, the angular rate may be derived from the gimbal angle information. It is also possible that a radio source such as an instrument landing system (ILS) with distance measuring equipment (DME), a ground based approach radar with uplink or an airborne approach radar with ground-based transponders may be available to provide the ground velocity and course information in conjunction with body mounted accelerometers. In such a case, the vertical gyro and gyro compass may be utilized for angular resolution and vertical velocity can be obtained by blending the accelerometers with a barometric or radar altimeter. It will, therefore, be understood that the present invention has been described by way of illustration rather than limitation.

What is claimed is:

1. A translational acceleration control system, with velocity holding capability, for a rotor driven VTOL aircraft comprising:
   means for providing a translational acceleration command signal;
   means for integrating the translational acceleration command signal to produce a commanded ground speed signal;
   means for providing a longitudinal ground speed signal;

means for combining the commanded ground speed signal with the longitudinal ground speed signal to produce a ground speed error signal;

compensating means, connected to the output of the combining means for producing said ground speed error signal, for producing a compensated incremental ground speed error signal proportional to the error in ground speed and the integral of the error;

means for combining the compensated ground speed error signal produced by said compensating means with the translational acceleration command signal to provide a pitch attitude command signal;

means for providing a pitch attitude signal;

means for providing a pitching rate signal; and means for combining the pitch attitude command signal with the pitch attitude signal and with the pitching rate signal to produce a control signal for controlling the angle of attack of the rotors of the VTOL aircraft to thereby control the aircraft pitching moment.

2. A course rate control system, with a course hold capability, for a rotor-driven VTOL aircraft comprising:

means for providing a course rate command signal;

means for integrating the course rate command signal to produce a course command signal;

means for providing a course signal;

means for combining the course command signal with the course signal to produce a course error signal;

compensating means connected to the output of said combining means for producing a compensated incremental course command signal proportional to the course error and the integral of course error;

means for combining the compensated course error signal produced by said compensating means with the course rate command signal to provide a roll attitude command signal;

means for providing a roll attitude signal;

means for providing a roll rate signal; and means for combining the roll attitude command signal, the roll attitude signal and the roll rate signal to produce a control signal for controlling the lateral cyclic pitch of the rotors of the VTOL aircraft to control the aircraft rolling moments.

3. An aircraft heading rate control system with heading hold turn capability comprising:

means for providing a heading rate command signal;

means for integrating said heading rate command signal to produce a heading command signal;

means for providing a heading reference signal;

means for combining the said heading reference signal with the heading command signal to produce a heading error signal;

means for providing a yaw rate damping signal; and means for combining said yaw rate damping signal, heading error signal and heading rate command signal to control the aircraft.

4. An aircraft control system as described by claim 3 including:

means for providing an airspeed signal; and means for automatically selecting between a heading rate command signal based system for operation at airspeeds less than a preselected speed or a sideslip command signal based system for operation at airspeeds greater than a preselected speed, thus permitting the use of the same means for providing the heading rate command signal as provides the sideslip command signal.

5. A course deviation control system for a rotor-driven VTOL aircraft comprising:

means for providing a course deviation command signal;

means for providing a course signal;

means for combining the course deviation command signal with the course signal to produce a roll attitude command signal;

means for providing a roll attitude signal;

means for providing a roll rate signal; and means for combining the roll attitude command signal, roll attitude signal and roll rate signal to produce a control signal for controlling the lateral cyclic pitch of the rotors of the VTOL aircraft to control aircraft rolling moments, said system further comprising means for sensing the ground speed of the VTOL aircraft and means responsive to said sensing means for converting the system to a course rate control system when the ground speed exceeds a predetermined value.

6. An aircraft collective channel system for controlling rate of descent with altitude hold capability comprising:

means for providing a rate of descent command signal;

means for integrating the rate of descent command signal to produce an altitude command signal;

means for providing an altitude signal;

means for combining the altitude command signal with the altitude signal to produce an altitude error signal;

means for combining the altitude error signal with the rate of descent command signal to produce a net rate of descent command signal;

means for providing a rate of descent signal; and means for combining the net rate of descent command signal with the rate of descent signal to control the aircraft.

7. An aircraft course rate control system with a course hold capability comprising:

means for providing a course rate command signal;

means for integrating the course rate command signal to produce a course command signal;

means for providing a course signal;

means for combining the course command signal with the course signal to produce a course error signal;

means for combining the course error signal with the course rate command signal to provide a roll attitude command signal;

means for providing a roll attitude signal;

means for providing a roll rate signal; and means for combining the roll attitude command signal, the roll attitude signal and the roll rate signal to control the aircraft; and means for automatically blocking the course rate command signal input to the integrating means when ground speed is less than a preselected speed, thus causing the means for providing the course rate command signal to behave as a means for providing a course deviation command signal and the control system to behave as a course deviation command system with respect to the course held by the integrating means.

8. An aircraft course rate control system with a course hold capability comprising:

means for providing a course rate command signal;

means for integrating the course rate command signal to produce a course command signal;

means for providing a course signal;

means for combining the course command signal with the course signal to produce a course error signal;

means for combining the course error signal with the course rate command signal to provide a roll attitude command signal;

means for providing a roll attitude signal;

means for combining the roll attitude command signal, the roll attitude signal and the roll rate signal to control the aircraft, said system further comprising means for providing a sideslip command signal;

means for providing a sideslip signal;

means for combining the said sideslip command signal and sideslip signal to produce a sideslip error signal;

means for providing a yaw rate damping signal; and means for combining said sideslip error signal, roll attitude command signal from the roll axis, and yaw rate damping signal to provide coordinated turn capability for controlling the aircraft.

9. An aircraft control system as described by claim 8 including:

means for filtering the roll attitude command signal for the purpose of smoothing prior to crossfeeding said signal from the course rate command signal based system to the sideslip command signal based system.

10. An aircraft control system as described by claim 8 including:

means for providing an airspeed signal; and means for automatically selecting between a heading rate command signal based system for operation at airspeeds less that a preselected speed or a sideslip command signal based system for operation at airspeeds greater than a preselected speeds, thus permitting the use of the same means for providing the heading rate command signal as provides the sideslip command signal.

* * * * *